United States Patent
Exley et al.

(10) Patent No.: US 6,290,431 B1
(45) Date of Patent: *Sep. 18, 2001

(54) DIVERLESS SUBSEA HOT TAP SYSTEM WITH LATERAL PIPE TIE-IN

(75) Inventors: Gern D. Exley; Donald W. Cross, both of Houston; Oran Tarlton, League City; Larry Decker, The Woodlands, all of TX (US); David J. Hicks, Tulsa, OK (US); Richard W. McCoy, Houston, TX (US)

(73) Assignee: Williams Field Services Gulf Coast Company, L.P., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,577

(22) Filed: Feb. 3, 2000

Related U.S. Application Data

(63) Continuation-in-part of application No. 09/417,553, filed on Oct. 13, 1999
(60) Provisional application No. 60/128,014, filed on Apr. 6, 1999.

(51) Int. Cl.[7] ................................ F16L 1/00; F16L 55/18
(52) U.S. Cl. ...................... 405/158; 405/168.1; 405/173; 15/3.5; 137/15; 137/317
(58) Field of Search ..................... 405/156, 158, 405/168.1, 169, 170, 173, 154.1; 15/3.5; 137/15.12, 317

(56) References Cited

U.S. PATENT DOCUMENTS

| | | | |
|---|---|---|---|
| Re. 27,745 | 8/1973 | Brooks et al. | 166/336 |
| 3,508,410 | 4/1970 | Lynch | 405/190 |
| 3,578,233 | 5/1971 | Meister et al. | 228/5.1 |
| 3,851,492 | 12/1974 | Cannon et al. | 405/191 |
| 4,076,130 | 2/1978 | Sumner | 405/170 |
| 4,091,514 | 5/1978 | Motes-Conners et al. | 29/33 T |
| 4,116,015 | 9/1978 | Duncan | 405/169 |
| 4,155,669 | 5/1979 | Rochelle | 405/158 |
| 4,223,925 | 9/1980 | Reneau et al. | 285/197 |
| 4,229,121 | * 10/1980 | Brown | 405/158 |
| 4,436,449 | 3/1984 | Smoot et al. | 405/170 |
| 4,441,328 | 4/1984 | Brister | 62/53.1 |
| 4,443,129 | 4/1984 | de Sivry et al. | 405/170 |
| 4,450,857 | 5/1984 | Baugh et al. | 137/318 |
| 4,535,822 | 8/1985 | Rogers, Jr. | 138/99 |
| 4,579,480 | 4/1986 | Szabo et al. | 405/169 |
| 4,579,484 | 4/1986 | Sullivan | 408/56 |
| 4,720,213 | 1/1988 | Gernhardt et al. | 405/190 |
| 4,784,525 | 11/1988 | Francois | 405/191 |
| 4,832,530 | 5/1989 | Andersen et al. | 405/170 |
| 4,878,694 | 11/1989 | Castel | 285/24 |
| 4,880,335 | 11/1989 | Lee | 405/158 |
| 5,074,713 | 12/1991 | Reis | 405/169 |
| 5,439,331 | 8/1995 | Andrew et al. | 408/8 |
| 5,593,249 | 1/1997 | Cox et al. | 405/191 |
| 5,642,965 | 7/1997 | Dos Reis et al. | 405/191 |
| 6,200,068 | * 3/2001 | Bath et al. | 405/154.1 |

* cited by examiner

*Primary Examiner*—David Bagnell
*Assistant Examiner*—Tara L Mayo
(74) *Attorney, Agent, or Firm*—Head, Johnson & Kachigian

(57) ABSTRACT

A diverless process of tapping a pressurized subsea pipeline without removing the pipeline from service. The process includes the steps of lowering and landing a measurement tool onto the pipeline in order to check ovality and straightness of the pipeline. Pipe lift frames are lowered and landed onto the pipeline spaced from a chosen location. The pipeline is lifted by hydraulic actuators or mechanical screws on the lift frames. A hot tap machine and accompanying orientation frame are lowered from the surface and landed on the pipeline between the pipe lift frames. A fitting clamp is secured to the pipeline. A hot tap machine is lowered onto the hot tap fitting and orientation frame. The pipeline is then tapped with the hot tap machine.

11 Claims, 20 Drawing Sheets

DIVERLESS SUBSEA HOT TAP SYSTEM WITH LATERAL PIPE TIE-IN

CROSS-REFERENCE OF RELATED APPLICATION

This application claims priority to U.S. Provisional Patent Application No. 60/128,014 filed Apr. 6, 1999, entitled DIVERLESS SUBSEA HOT TAP SYSTEM and is a continuation-in-part of U.S. patent application Ser. No. 09/417,553 filed on Oct. 13, 1999, entitled DIVERLESS SUBSEA HOT TAP SYSTEM.

BACKGROUND OF THE INVENTION

1. Field of the Invention

The present invention relates to a diverless process for tapping a pressurized subsea pipeline without removing the pipeline from service. This diverless process utilizes specialty clamping equipment, tapping equipment and remote operating vehicles for operating at water depths beyond that accessible by divers.

2. Prior Art

Various kinds of underwater pipeline work have been carried out using divers equipped with various tools. Deep water conditions entail high subsea pressure and dangerous conditions. Manned or diver equipped operations are not suitable if the pipeline is at a depth which is inaccessible by divers.

Remote operating vehicles perform visual and operational functions that are more limited than those functions performed by divers. To compensate for this limitation, processes must be developed to adapt the available technology to the work requirements. These processes are typically referred to as "diverless". Developed diverless processes are easily adapted for use using divers and/or control from the sea surface in diver accessible water depths.

It has been proposed in the past to utilize a diverless underwater pipe tap system. De Sivry et al. (U.S. Pat. No. 4,443,129) discloses an example of a diverless underwater pipe tap system including a lifting device to engage and displace the pipe, a working platform installed vertically above the tapping region and various tools used to carry out operations including concrete stripping, ovality or roundness measurement, and a tapping operation. De Sivry et al. contemplates cutting out a section of the pipeline. There is no disclosure or suggestion of a tap procedure while the pipeline is under pressure and de Sivry would not be suitable for such an operation.

Likewise, various hot tap machines for tapping into a pipeline while the pipeline is pressurized have been disclosed. Reneau et al. (U.S. Pat. No. 4,223,925) discloses one example of a hot tap machine for an underwater pipeline. It is advantageous to perform work on the pipeline without interrupting the flow of liquids or gases therethrough.

It is also known to provide a remote operated subsea vehicle (ROV) controlled from the surface which includes thrusters or other mechanisms for propelling it through the water in response to a source of power at or controlled from the surface.

Brooks et al. (Re27,745) illustrates an example of a submersible wireline robot unit that may be controlled remotely.

None of the foregoing would be suitable for deep water conditions where the external subsea pressure is extreme.

Given that the life spans of certain deep water oil and gas developments will be coming to an end in the near future, there will be an increasing number of existing pipelines which have excess transport capacity, thereby leaving excess pipeline infrastructure in deep water locations.

If production from new fields can be tied into existing pipelines, then the investment in the pipeline can be spread out over more than one development. A diverless hot tap capability would allow the extension of pipelines from new fields to be connected to existing pipelines. This will reduce the overall length of the pipeline required to support a new field.

It would also be possible to lay new trunk lines into areas in order to support multiple future field developments which would use lateral pipelines without having to pre-install connection facilities and valves at predetermined locations along the pipeline.

Additionally, in deep water oil and gas developments, the cost of the pipeline infrastructure is estimated to be the majority of the cost of all of the installed subsea equipment.

As an alternative to diverless hot tap systems, it would be possible to take an existing line out of service, cut a section of the pipeline and bring it to the surface, install a valve, lower the section back to the bottom and reconnect with a suitable jumper. Such an approach is not only time-consuming but requires the pipeline to be out of service. It would also be possible to pre-install blind branch connection facilities in the pipeline for future tie-ins. A disadvantage is that a great number of branch facilities would have to be installed to cover all possible future tie-in locations, a procedure that would be both time-consuming and expensive.

Notwithstanding the foregoing, there remains a need for a diverless process of tapping a deep water subsea pipeline under high pressure without removing the pipeline from service.

SUMMARY OF THE INVENTION

The invention described herein is a diverless process for tapping into a deep water, pressurized subsea pipeline without removing the pipeline from service. This invention provides a method to hot tap into an existing subsea pipeline and connect a second, or multiple, pipelines by means of a horizontal pull-in and connection process.

The initial phase will be locating a desired position of the hot tap along the pipeline and determining the in-situ conditions at that location. Various means such as subsea cameras, side-scan sonar, towed vehicles and remotely operated vehicles (ROV) may be used to locate and identify an area of interest. A preferred location on the pipeline will be indicated by the absence of any circumferential or longitudinal welds.

After the desired area of interest and pipe section have been located, it may be necessary to excavate soil, sand or silt from underneath the pipeline to provide access for the hot tap equipment. A work-class ROV may be used to blow away the soil, sand or silt or a suction dredge may be used to remove it, thereby creating an excavated area for installing the hot tap equipment. It may then be necessary for the ROV to clean the pipeline using a hydraulically operated brush or low pressure water jet.

In the next stage, two or more pipe lifting frames will be lowered from the surface and aligned by the ROV to straddle the pipeline during positioning. The lifting frames will be spaced at appropriate positions along the pipeline to effectively lift the pipeline without exceeding its plastic limit or otherwise damaging the pipeline. The distance between, and the number of lifting frames required, will be dependent upon the pipe size, wall thickness, internal pressure, soil conditions and other site-specific parameters.

Each of the lifting frames incorporates a pipe grip mechanism that can move transverse or perpendicular to the axis of the pipeline and lowered onto the pipeline using hydraulic supply and controls provided by the ROV. The pipe lifting frames are also fitted with mud mats that may be extended or retracted by the ROV to provide sea bed stability.

After the lifting frame is positioned over the pipeline at the desired location, the pipe grip mechanism is lowered onto the pipeline using the ROV hydraulic supply and controls. After the pipe grip is lowered and brought into contact with the pipeline, the grip mechanism is closed securely around it and hydraulically locked. The pipe grip mechanism, then supporting the pipeline, is raised to the desired height above the sea bed by the ROV using a mechanical jack screw device or hydraulic means. The second pipe lifting frame is landed and operated in a similar manner so that the pipeline is supported by at least two lifting frames.

When the pipeline has been raised to the desired height by the pipe lifting frames, a measurement tool will be lowered from the surface on to the pipeline to check pipe roundness, ovality and axial alignment or straightness. The measurement tool will be guided into position and then powered and controlled by the ROV.

After the pipeline has been checked for ovality and straightness, the measurement tool will inspect the pipeline condition at the desired hot tap area and note any anomalies or welds in the area. In the event that the pipeline contains a longitudinal weld that would affect the sealing area, a weld bead removal tool will be lowered from the surface and guided onto the pipeline by the ROV. The ROV will then operate the weld bead removal tool to machine the weld flush with the pipe surface.

In the next stage, a pipe fitting frame assembly will then be lowered over the pipeline at the desired hot tap location. The pipe fitting frame assembly will include a hot tapping machine pre-installed at surface level on a hot tap fitting clamp by means of a releasable connector. The hot tapping machine and hot tap fitting clamp are integrated together into the pipe fitting frame. The hot tap cutter will be in retracted position during lowering to preclude initial contact with, and possible damage to, the pipeline.

After the pipe fitting frame has landed out on the pipeline, it is secured to the pipe by means of two ROV-operated pipe clamps located at opposite ends of the frame. Next, the hot tap fitting clamp is extended to the pipe and closed around it by means of ROV-supplied hydraulics and controls. After the hot tap clamp has been closed around the pipe, the ROV will tighten each of the clamp bolts. After the hot tap clamp has been securely tightened, the ROV will confirm that the hot tap isolation valve is open. Next, the ROV will perform an external seal test on the hot tap clamp and hot tapping machine assembly prior to making the hot tap.

Following a successful external seal test, the ROV will operate the hot tapping machine to perform the hot tap. The hot tapping machine will tap the pipeline using its cutter mechanism. When the hot tap operation has been completed and confirmed, the ROV will close the hot tap isolation valve and unlatch the hot tapping machine from the releasable connector hub which is located outboard of the hot tap isolation valve. The hot tapping machine and its support frame will then be retrieved to the surface.

In the next stage, a lateral pipe connector guide is lowered from the surface and guided into alignment stabs fixed to the pipe fitting frame. After the lateral pipe connector guide has landed out and secured to the pipe fitting frame, the ROV will pay out two pull-in cables from hydraulic winches mounted on the frame and attach them to the lateral pipe connector pull-in skid. The ROV then operates hydraulic winches to pull in the lateral pipeline connector to a position near the mating face of the releasable connector hub.

Next, the ROV will stroke the lateral pipe connector to seat against the mating hub and sequentially lock the connector to the hub. To ensure the connector is locked and to confirm the sealing integrity of the connection, the ROV will perform a final external seal test.

Following a successful external seal test, the ROV then opens the hot tap isolation valve which permits product flow to the lateral pipeline system. Finally, after the pipeline has been connected and tested, the lateral pipe connector guide and associated equipment are retrieved to the surface.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
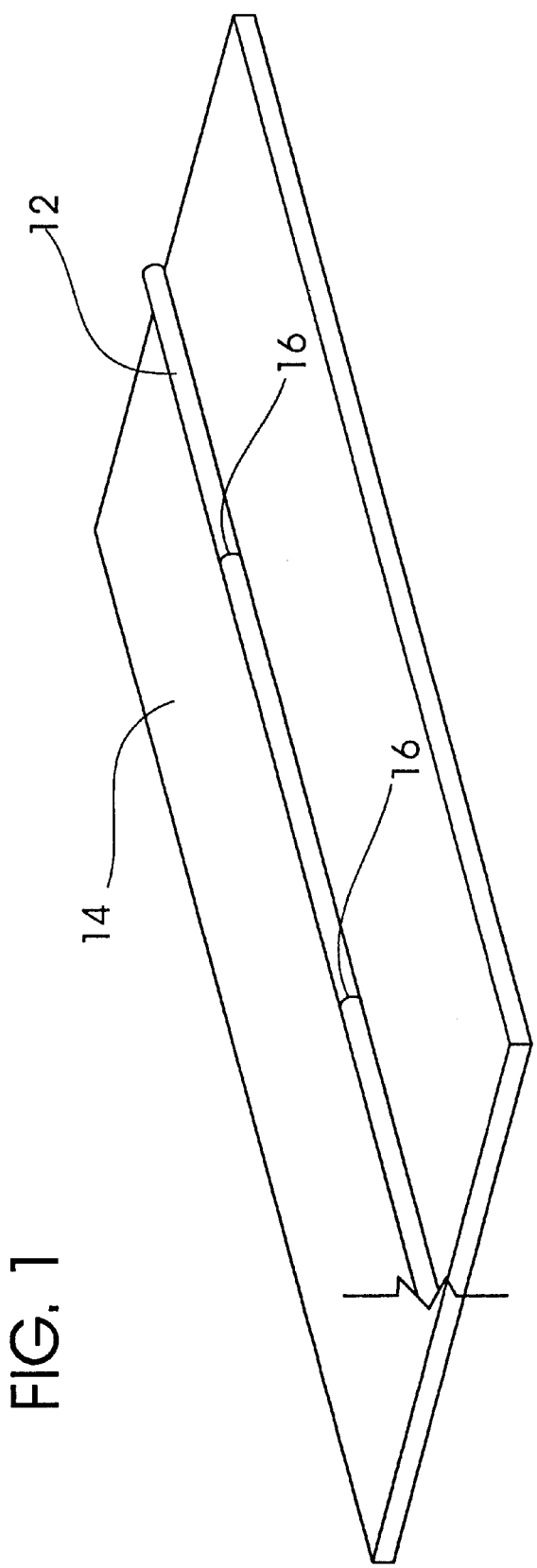
FIG. 1 illustrates an underwater deep sea pipeline residing on a sea floor or sea bed prior to the application of the present invention.

Referring to the drawings in detail, FIG. 1 illustrates a section of an underwater deep sea pipeline 12 residing on and supported by a floor 14 of a sea bed. FIG. 1, thus, illustrates the pipeline 12 prior to application of the present invention. The pipeline 12 will consist of a number of sections joined together with a plurality of circumferential welds 16. Depending on the size of the pipeline and other factors, longitudinal welds (not seen) may also be encountered. Deep water locations, such as at 6,000 feet and below are known to produce high pressure conditions external to the pipeline, relative to the internal pressure of the pipeline. The present invention is adaptable to various diameter pipelines but is particularly useful for 10" to 20" diameter pipelines.

Figure 2:
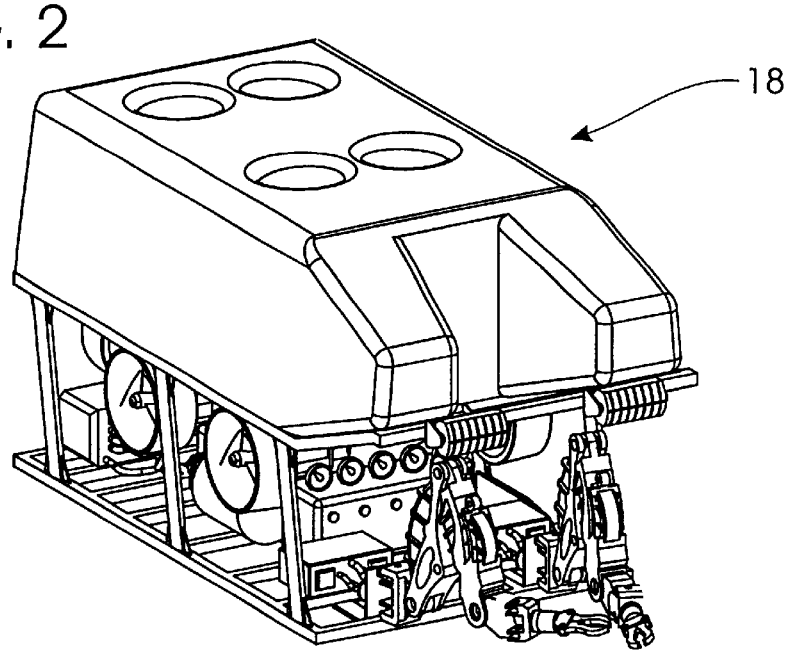
FIG. 2 illustrates an example of a remote operating vehicle.

A remote operating vehicle (ROV) 18, shown in FIG. 2, will assist in performing many of the steps or operations to be described in the present invention. The remote operating vehicle 18 will be controlled and may be powered from the surface. Various unmanned ROV's are well known in the field.

During the initial stages of the invention, the pipeline 12 will be located and a series of comprehensive procedures will be performed. Subsea cameras, side-scan sonar, towed vehicles and remotely operated vehicles (ROV) may be used to locate and identify an area of interest. A preliminary visual condition inspection will be conducted through the use of underwater cameras. The bottom conditions will be reported, the water current will be reported, the visibility surrounding the pipeline will be reported, the type of soil on the sea bed will be reported and the depth of the pipeline will be reported. Other survey information may be necessary and would be obtained. Additionally, the location of circumferential pipe seams and welds, if any, will be reported. The nature and condition of any coating on the pipeline, such as concrete or other material, will also be reported.

The pipeline 12 will be inspected in the area of interest and a pipe section will be identified between circumferential pipe welds 16. A preferred location on the pipeline will be the absence of any longitudinal welds that, if present, may be later removed by a grinding tool or similar mechanism operated by the ROV. A circumferential weld 16 will be located and then a location along the pipeline will be located a short distance from the circumferential weld so that there will be no section of the hot tap fitting installed over or immediately adjacent to the circumferential weld.

At the outset, soil, sand or silt will be excavated from underneath the pipeline 12 to allow unrestricted installation of tools to be described herein. In one operation, the remote operating vehicle 18 will employ a pump to create a jet of sea water to blow away sand or silt from underneath the pipeline and create an excavated or exposed area beneath the pipeline. Alternatively, the ROV 18 may employ a suction device to create the desired excavation.

Therefore, the pipeline 12 at the selected location will be cleaned using a brush or low pressure waterjet powered and operated by the ROV. In some instances, external protective pipeline coating, such as fusion bonded epoxy, concrete or cement and the like, will be required to be removed prior to the next stage. A number of devices have been developed and are available to remove these coatings, and their use is possible within the scope of this invention.

Figure 3:
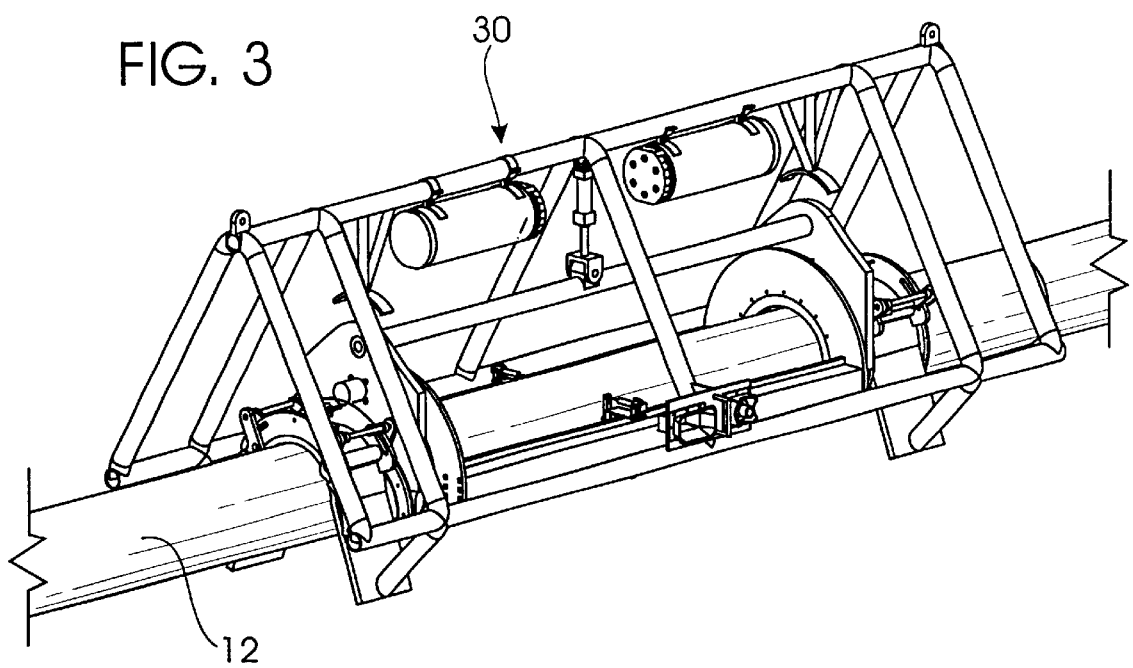
FIG. 3 illustrates a measurement tool used in the process of the present invention.

Once the foregoing preliminary procedures have been completed, a measurement or metrology tool 30 as seen in FIG. 3 will be lowered onto the pipeline 12 from the surface at the selected location in order to check the circumferential roundness of the pipeline while simultaneously checking the axial alignment or straightness of the pipeline. The measurement tool 30 will be guided into position by the ROV and powered and controlled by the ROV's systems through the surface operator. The measurement tool moves a probe and camera back and forth axially as well as around circumferentially on the pipe surface to measure ovality and check for surface imperfections. If the pipeline is determined to be within the tolerances of roundness and straightness, the measurement tool may be removed and returned to the surface. Alternatively, the measurement tool 30 may be left on, or adjacent to, the pipeline 12 for use in a later sequence in the operation.

If the pipeline fails the roundness and straightness test at that location, the measurement tool 30 will be moved axially to another location on the pipeline 12 and the measurement tests will be performed again until a satisfaction location is found.

Figure 4:
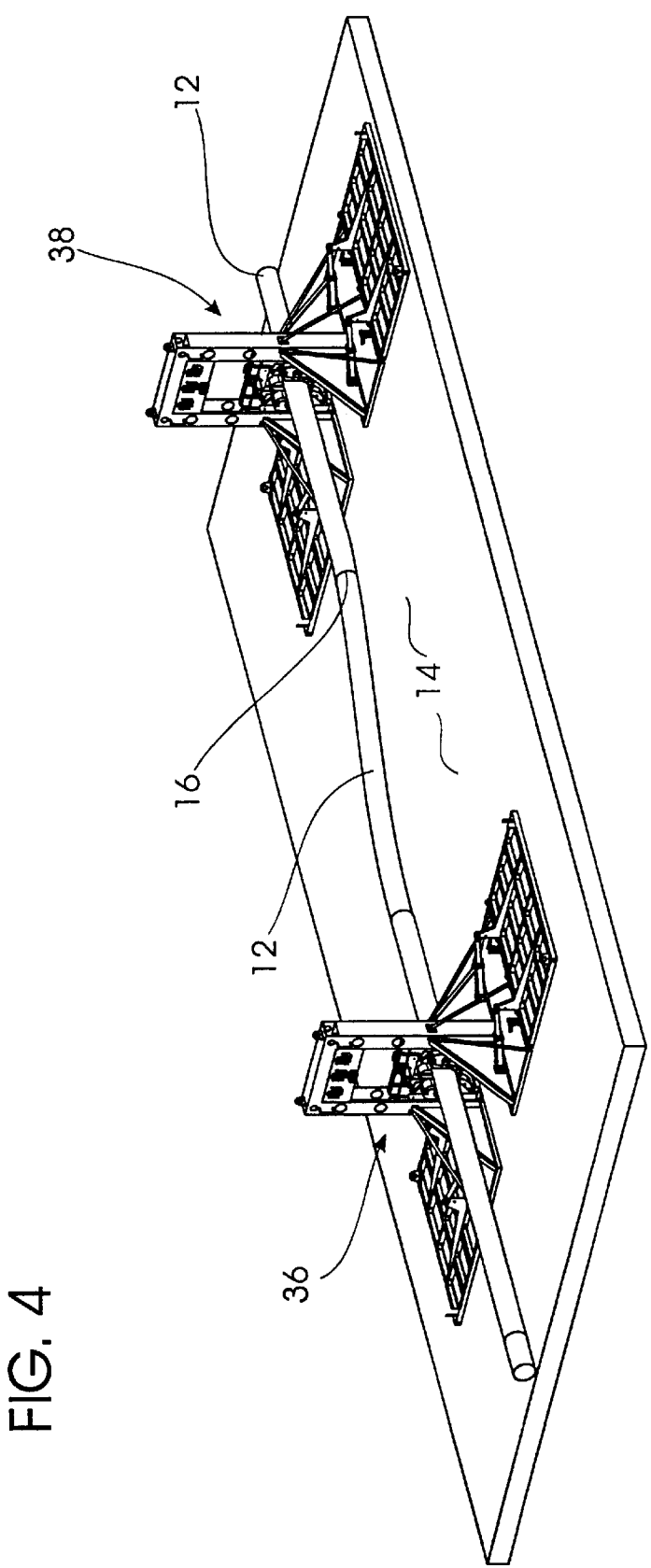
FIG. 4 illustrates installation of a pair of pipe lift frames, part of the process of the diverless hot tap system of the present invention.
Figure 5:
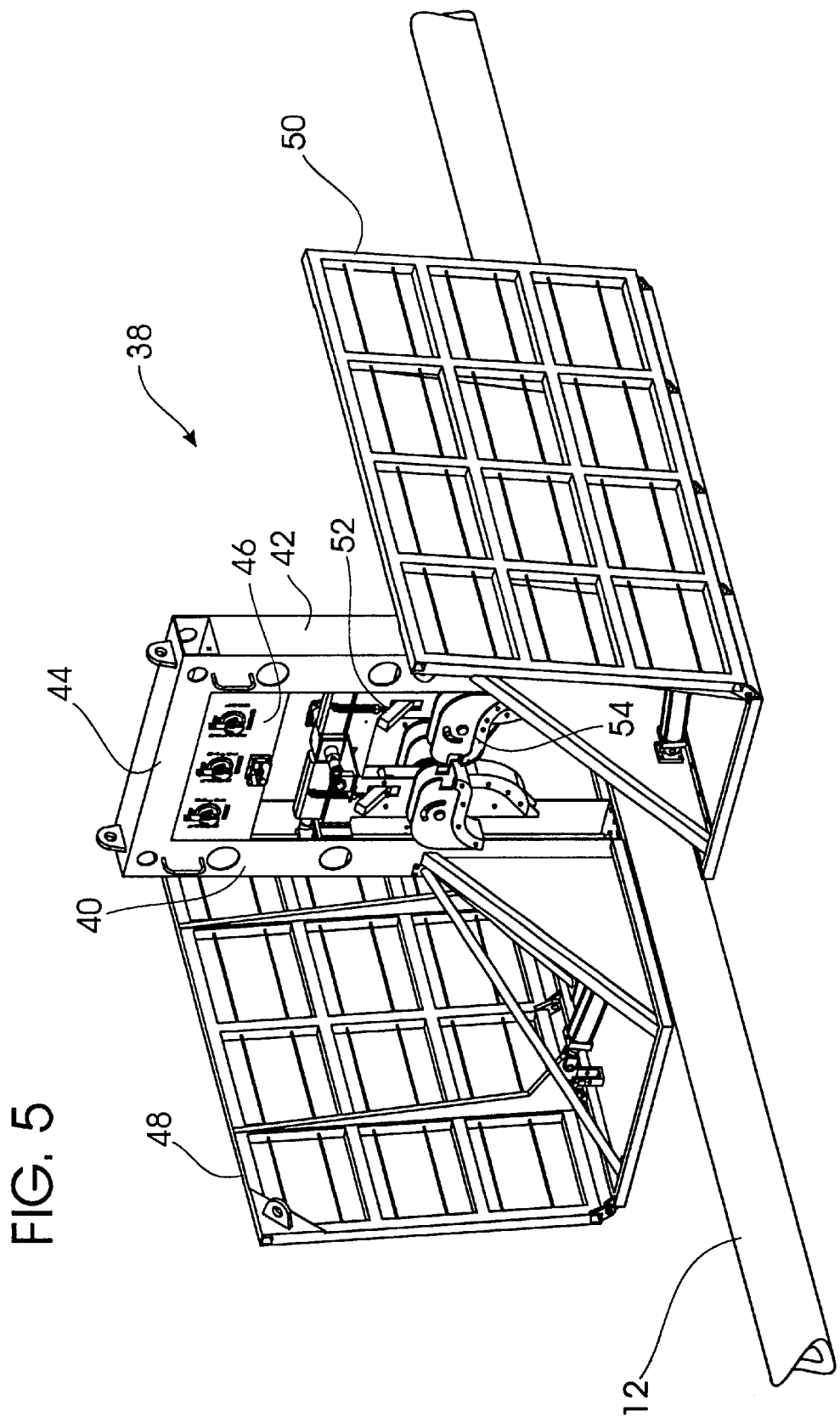
FIG. 5 illustrates the pipe lift frame being lowered with accompanying mud mats retracted.

As illustrated in FIG. 4, after a suitable location along the pipeline 12 has been determined, a pair of pipe lifting frames, 36 and 38, will be lowered from the surface to straddle the pipeline 12. FIG. 5 shows an enlarged drawing of one of the lifting frames 36 or 38, as it is being lowered into position.

At least one pair of the pipe lifting frames will be utilized. In some applications, four lifting frames (only two shown) will be required to achieve the desired results. Each lifting frame 36 and 38 will include a pair of opposed structural guides 40 and 42 and a cross-frame 44 upon which is installed a ROV control panel 46. Extendable mud mats 48 and 50 are installed on each side of the lifting frame which can be rotationally extended to provide seabed support. In the present embodiment, the mud mats are positioned by hydraulic cylinders. FIG. 5 shows the mud mats in the retracted, travel position. Between the vertical structural guides, 40 and 42, a transverse beam 52 is installed from which extends a pipe grip device 54.

The pipe grip device 54 may be moved transversely or perpendicularly to the axis of the pipeline 12 and lowered onto the pipeline 12 by means of a hydraulic system provided by the remote operating vehicle 18 and controlled through the ROV control panel 46. The pipe grip device 54 may be brought to a desired height in an even and incremental sequence by the ROV-controlled hydraulic system 46 acting upon hydraulic cylinders or other extension mechanism (not shown) within the vertical structural guides, 40 and 42.

Figure 6:
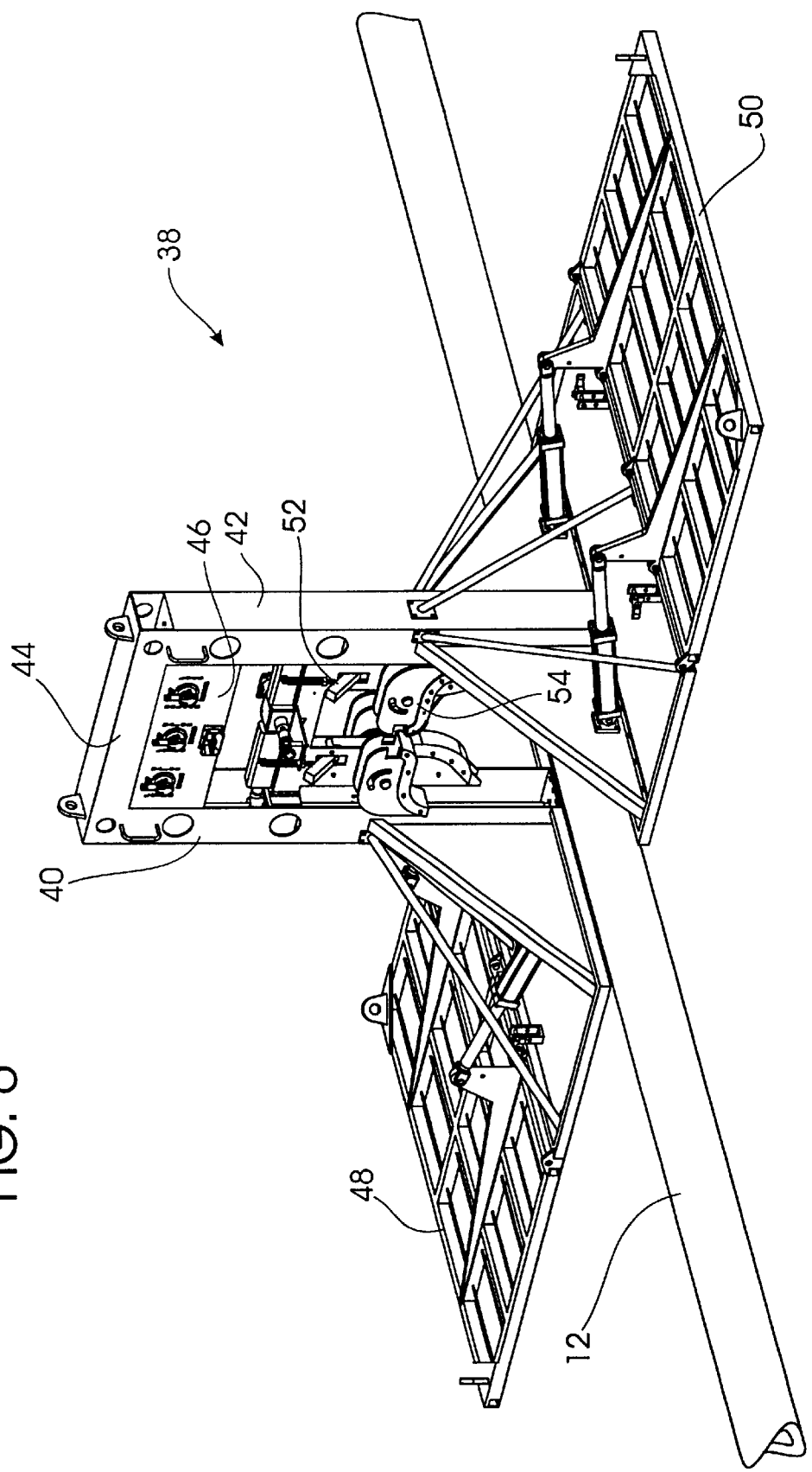
FIG. 6 illustrates the pipe lift frame landed out on the sea floor and positioned over the pipeline.

Before lifting the pipeline 12, the mud mats 48 and 50 are hydraulically lowered into position to rest securely on the seabed, as seen in FIG. 6. In the present embodiment, the mud mats are positioned by hydraulic cylinders.

Figure 7:
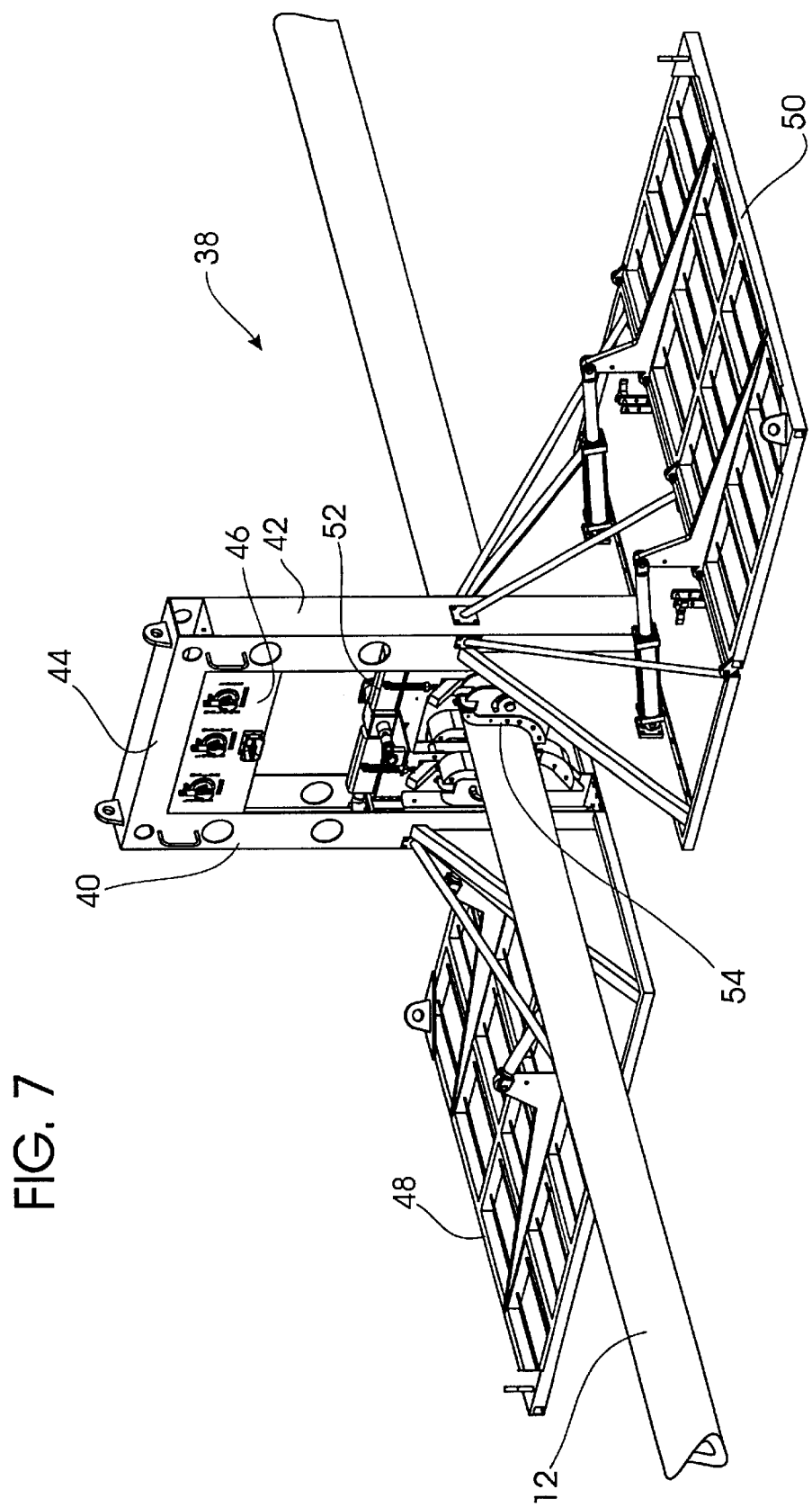
FIG. 7 illustrates the pipe lift frame clamped onto the pipeline and with the pipeline lifted off the sea floor for subsequent access.

The pipe grip device includes a pair of jaws which pivot to open or close. Next, the pipe grip device 54 is opened and lowered down to engage the pipeline 12. After initial contact, the pipe grip device 54 is closed around the pipeline 12 and mechanically locked. The pipeline 12 may then be raised to the desired elevated position, as best seen in FIG. 7.

This same sequence of operations is then repeated on each of the other pipe lifting frame or frames.

After both of the pipe lifting frames 36 and 38 have been installed as described and the pipeline 12 raised to the desired elevation, the measurement tool 30 will again be utilized to check the circumferential roundness and straightness of the pipeline 12.

If the measurement tool has not remained on the pipeline 12, it will be reinstalled between pipe lifting frames 36 and 38. The remote operating vehicle 18 will be used to power and operate the measurement tool 30. The roundness and straightness of the pipeline will again be checked in order to determine any effects of the aforementioned pipe lifting sequence. If the pipeline 12 is within the desired tolerances, the measurement tool 30 will be removed and retrieved to the surface. If the pipeline fails the measurement check, the pipe lifting frames may be repositioned and a new location selected for the forthcoming hot tap.

Figure 8:
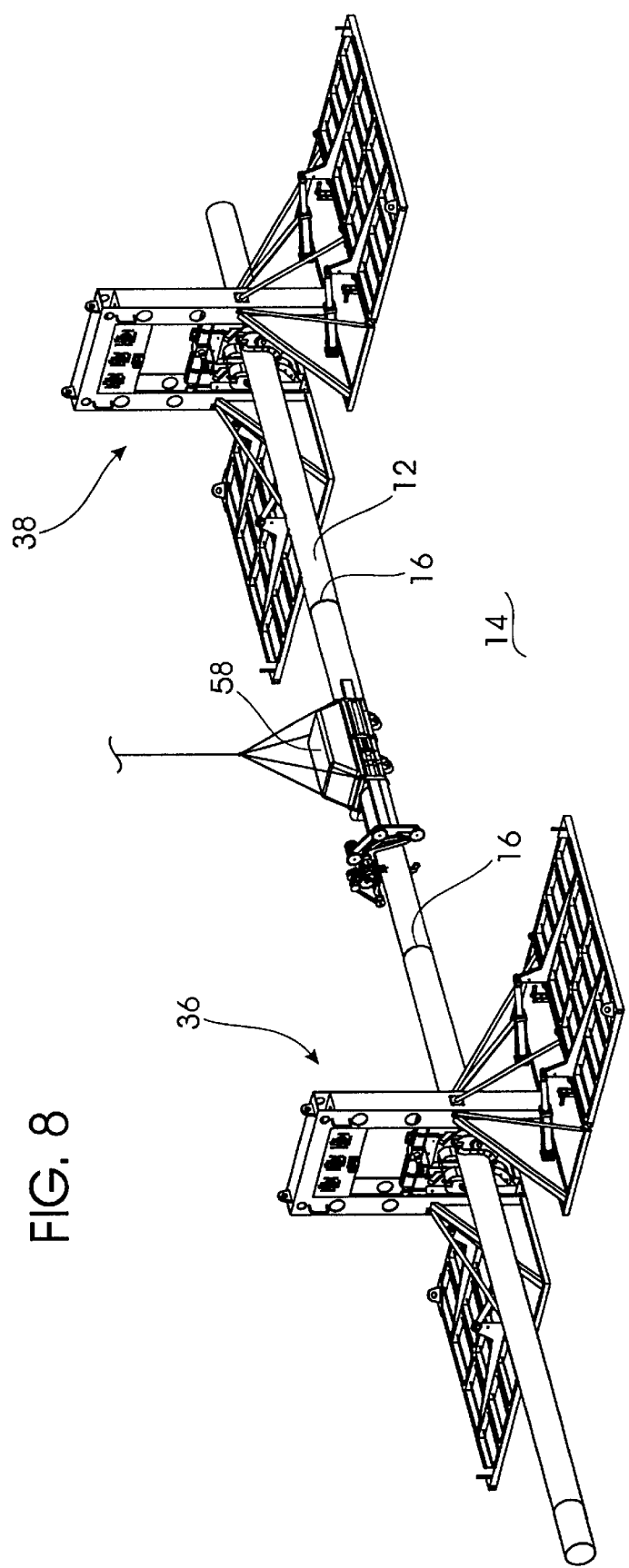
FIG. 8 illustrates the optional weld bead removal process.

The next step in the sequence of the process, shown in FIG. 8, will only be performed if the pipeline 12 contains a longitudinal weld. A weld bead removal tool 58 will be lowered from the surface and landed onto the pipeline 12 in a manner similar to the measurement tool. The remote operating vehicle (not seen) will be docked into the weld bead removal tool 58 and will remove any longitudinal weld by grinding or machining from the pipeline. Confirmation of the weld bead removal tool 58 will be made through a subsea camera. After satisfactory weld bead removal, the removal tool 58 will be removed from the pipeline 12 and retrieved to the surface.

Prior to performing a subsea hot tap of the pipeline 12, a hot tap fitting frame (to be described in detail) will be inspected on the surface and prepared for operation. The various seals and slips of the hot tap machine and fitting frame will be inspected. When the hot tap machine is used with a ball valve, it will be connected and checked. The hot tap machine and pre-installed ball valve are then rigged for deployment.

Figure 9:
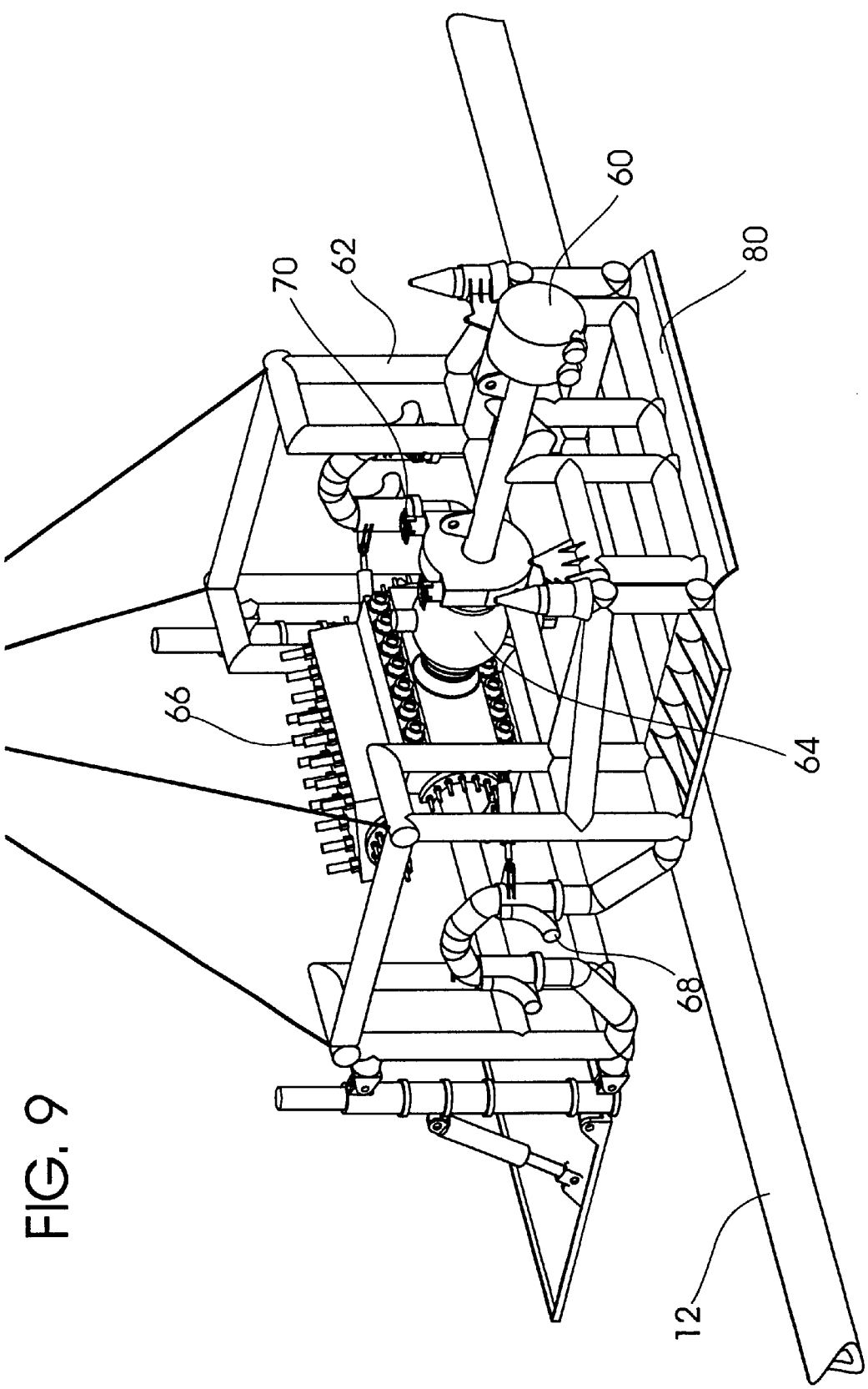
FIG. 9 illustrates the hot tap fitting frame being lowered with the hot tapping machine pre-installed on the frame.

FIG. 9 illustrates the next sequence in the process. A hot tap machine 60 installed on a fitting frame 62 together with the pre-installed ball valve 64 and pipe clamp 66 is lowered from the surface onto the pipeline 12. A hot tap machine support frame and horizontal structural guide 80 has also been mounted on the fitting frame 62 on the surface.

Hydraulically-operated pipe supports 68 and 70 are located at each end of the fitting frame 62 to capture the pipeline 12 after the frame has landed out on the pipeline. The combined hot tap machine/ball valve/pipe clamp assembly is supported in a structural guide system (not shown) within the lifting frame 62 that may be moved horizontally away from the pipeline during lowering and land out. The pipe clamp 66 is open at this stage in order to accept the pipeline 12 in a subsequent step.

Figure 10:
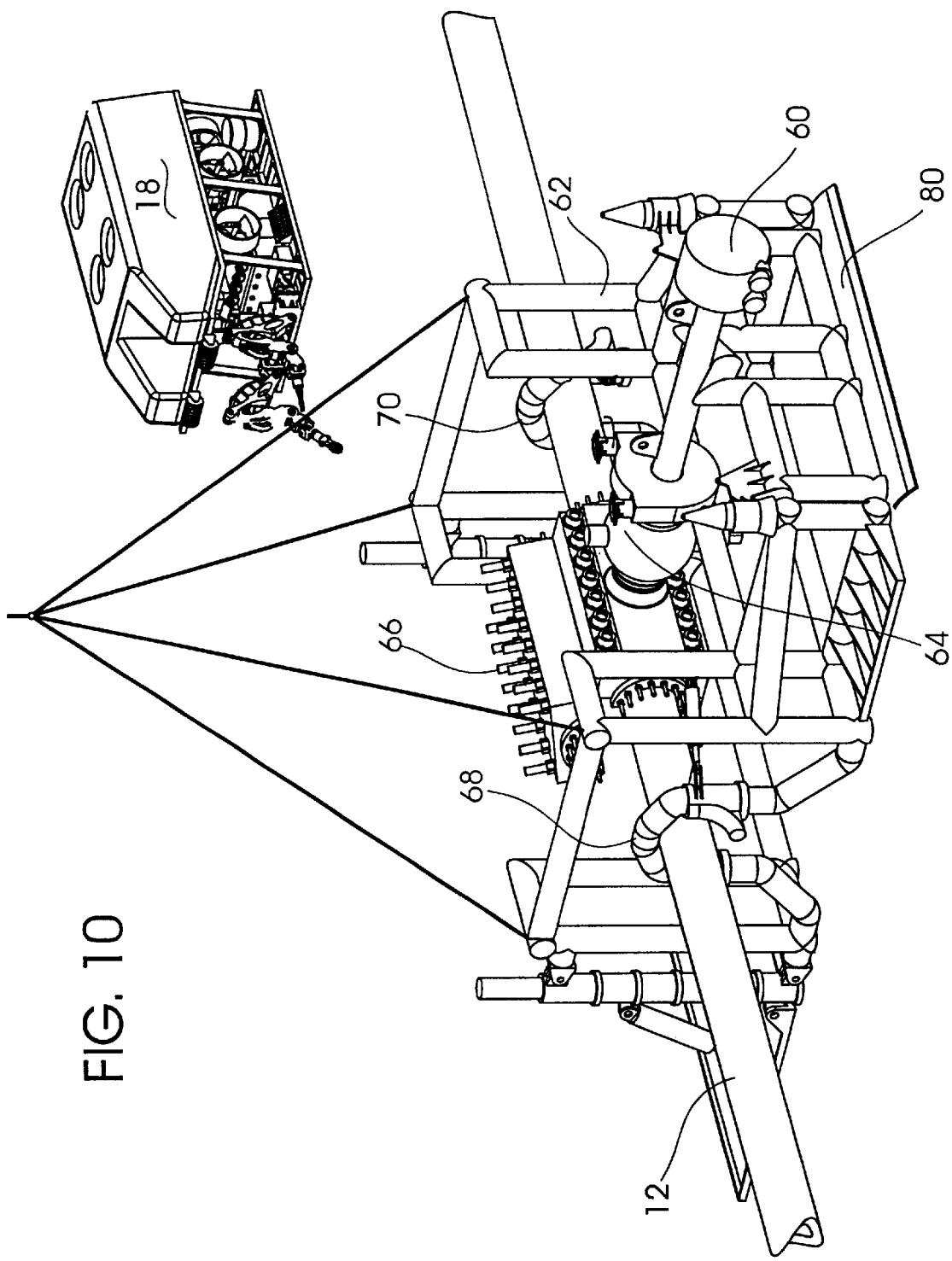
FIG. 10 illustrates the hot tap fitting frame landed out on the sea floor and positioned over the pipeline and between the pipe lift frames.

FIG. 10 illustrates the hot tap fitting frame 62 landed out on to the pipeline 12. The pipe supports 68 and 70 and the pipe clamp 66 are open and the hot tap machine/ball valve/pipe clamp assembly is retracted away from the pipeline 12 to prevent premature contact and possible damage to the pipeline 12. Each pipe support 68 and 70 includes a pair of U-shaped pieces that rotate between open and closed position.

Figure 11:
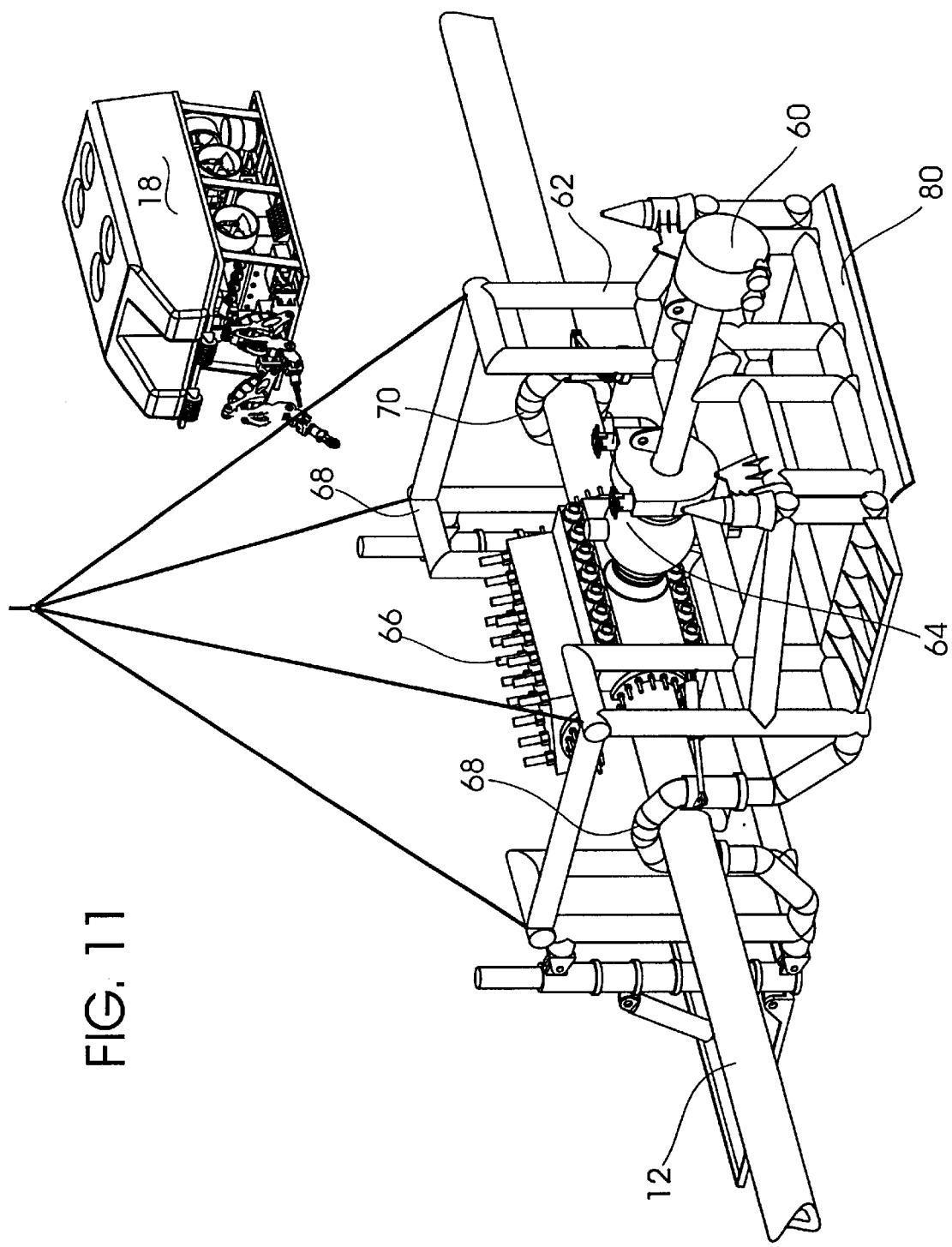
FIG. 11 illustrates the pipe support clamps on both ends of the hot tap fitting frame closed around the pipeline.

In FIG. 11, the ROV 18 has closed the pipe supports 68 and 70 at both ends of the fitting frame 62 and extended the hot tap machine/ball valve/pipe clamp assembly horizontally to contact the pipeline 12. After the hot tap machine/ball valve/pipe clamp assembly has been extended to contact the pipeline 12, the ROV 18 hydraulically closes the pipe clamp 66 around the pipeline. Closing the pipe clamp 66 is accomplished in three steps—1) the initial closing of the clamp 66; 2) subsequent tightening of the structural bolts along the side of the clamp 66; and 3) setting of the seals and packers by means of bolts at the end of the clamp 66. Other pipe clamp designs may embody alternate means to obtain the same required results (a structurally secure and leak-tight clamp) within the scope of this invention.

Figure 12:
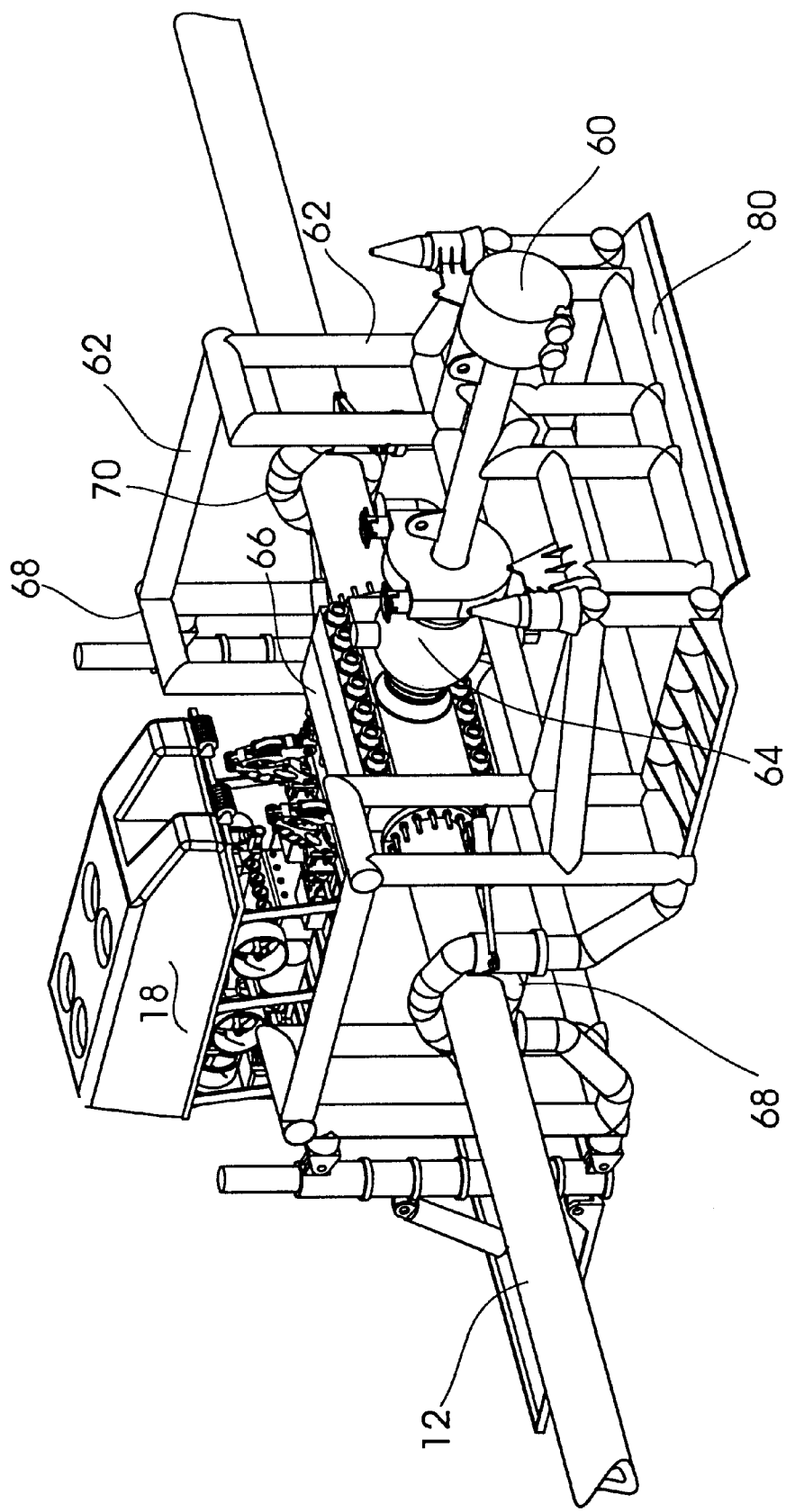
FIG. 12 illustrates the hot tap fitting clamps being aligned and closed onto the pipeline.

FIG. 12 illustrates the ROV 18 tightening the structural bolts along the side of the pipe clamp 66 using a hydraulically-operated torque tool (not shown). To ensure a positive leak-tight seal, the ROV 18 will be capable of monitoring grip displacement indicators and the pressure seal between the pipeline 12 and pipe clamp 66.

Figure 13:
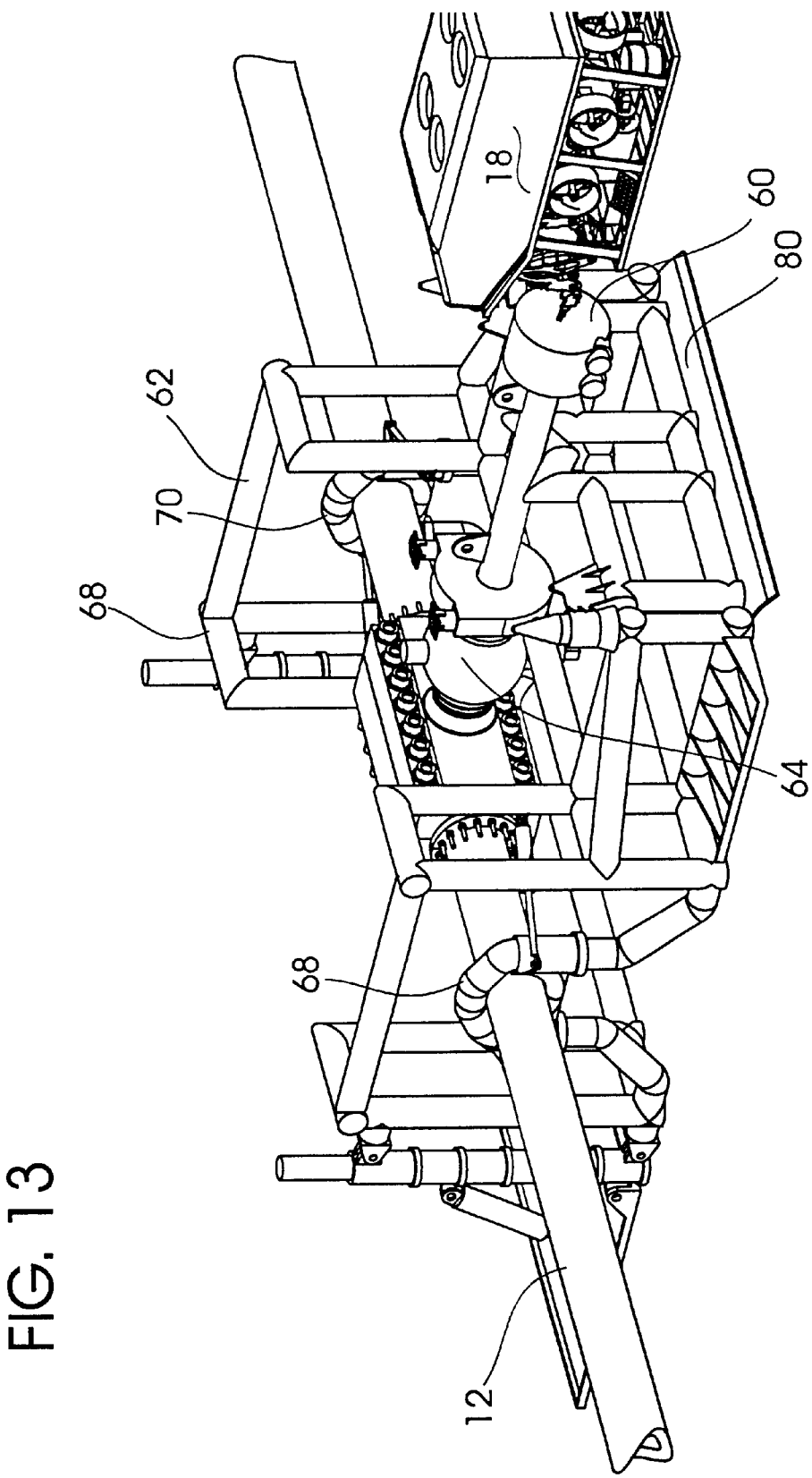
FIG. 13 illustrates the hot tap clamps being tightened on the pipeline by the remote operating vehicle.

In the next sequence as seen in FIG. 13, the ROV 18 operates the hot tap machine 60 using a cutter mechanism (not shown) to machine out the hot tap coupon. Prior to making the hot tap, the ROV 18 confirms that the pre-installed ball valve is in the "open" position. After making the hot tap, the hot tap cutter will be retracted through the ball valve 64 and the ball valve will be "closed" by the ROV 18.

Figure 14:
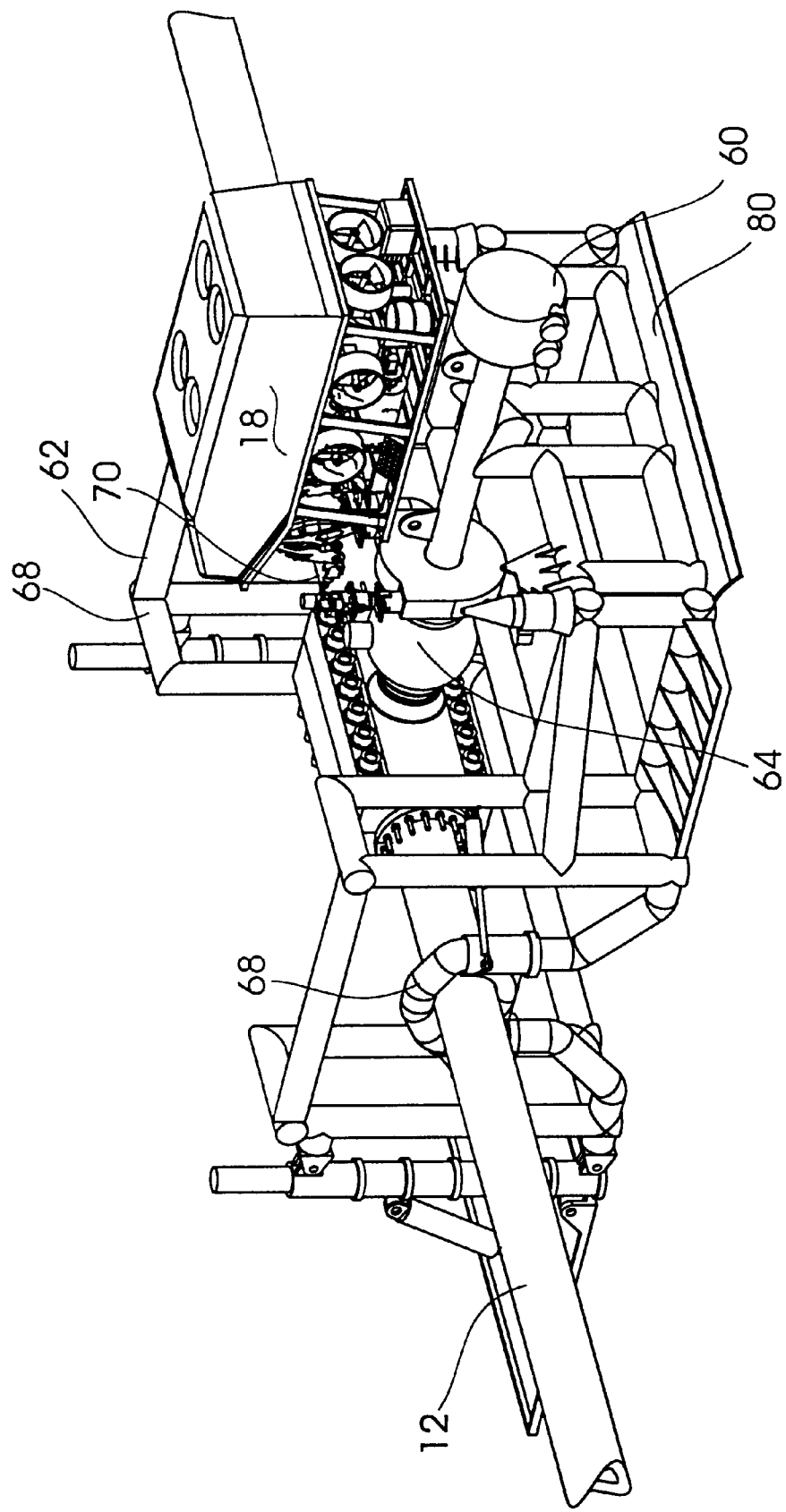
FIG. 14 illustrates the ROV operating the hot tap machine to make the pipeline hot tap.

After the hot tap has been completed, the ROV 18 disconnects the hot tap machine 60 from the ball valve 64 as shown in FIG. 14. This is accomplished by means of a mechanical (bolted flange or hub) or hydraulic connection between the ball valve 64 and hot tap machine 60. The present embodiment illustrates the use of a hub-type mechanical connection 20 which requires only 1 or 2 actuation screws to install.

Figure 15:
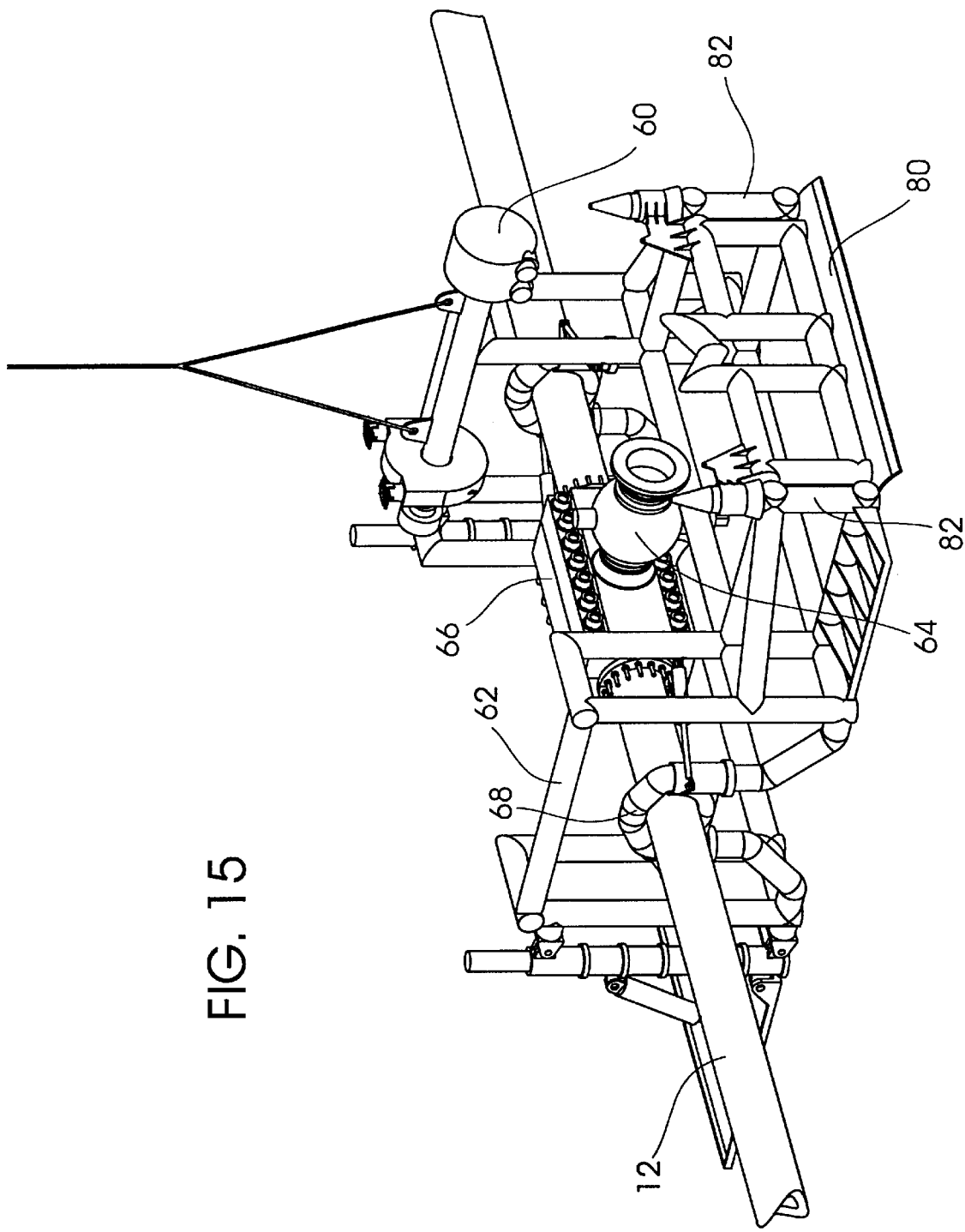
FIG. 15 illustrates the hot tap machine being retrieved to the surface.

FIG. 15 illustrates the hot tap machine 60 being retrieved to the surface. The ball valve 64 has been "closed" and the ROV 18 has checked the pipe clamp 66 and ball valve 64 for any leakage.

Figure 16:
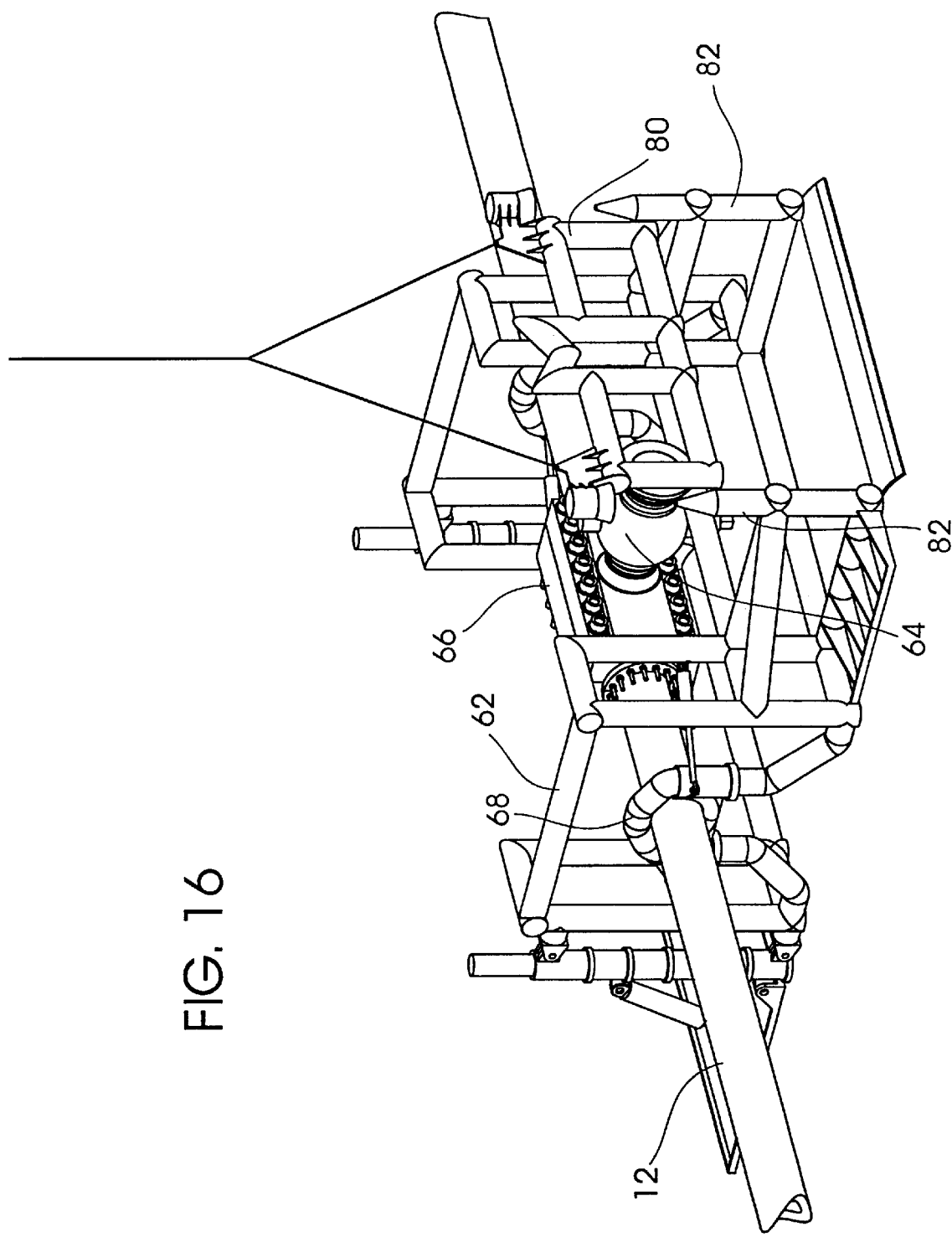
FIG. 16 illustrates the hot tap machine support frame being retrieved to the surface.

FIG. 16 illustrates the hot tap machine support frame and horizontal structural guide 80 being retrieved to the surface. This subassembly was supported and oriented by a plurality of vertical guideposts 82. An alternate configuration (not shown) wherein the hot tap machine, support frame and horizontal structural guide are integrated into a single system is within the scope of this invention.

Figure 17:
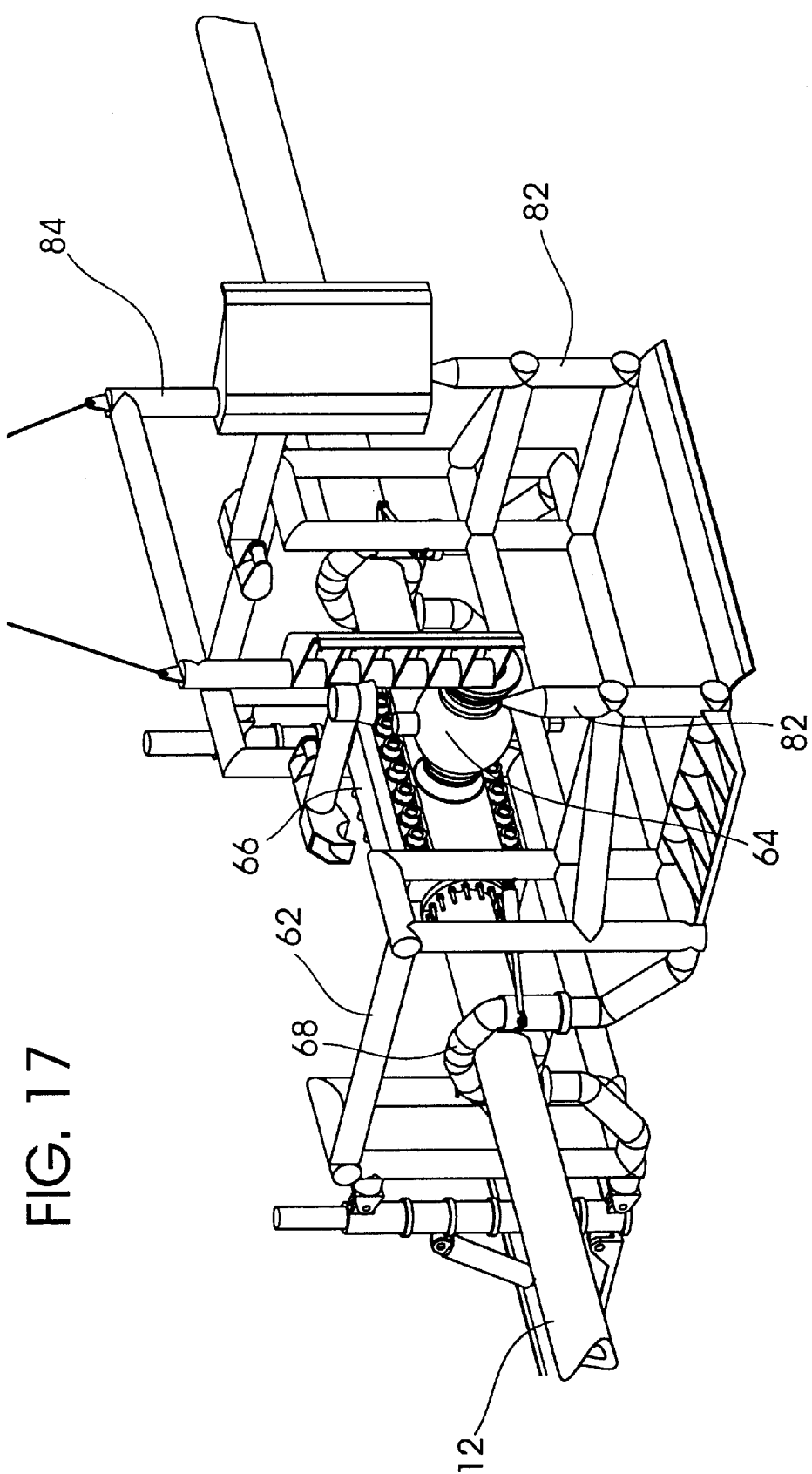
FIG. 17 illustrates the lateral pipe connector guide being lowered into position over the hot tap fitting frame guideposts.
Figure 18:
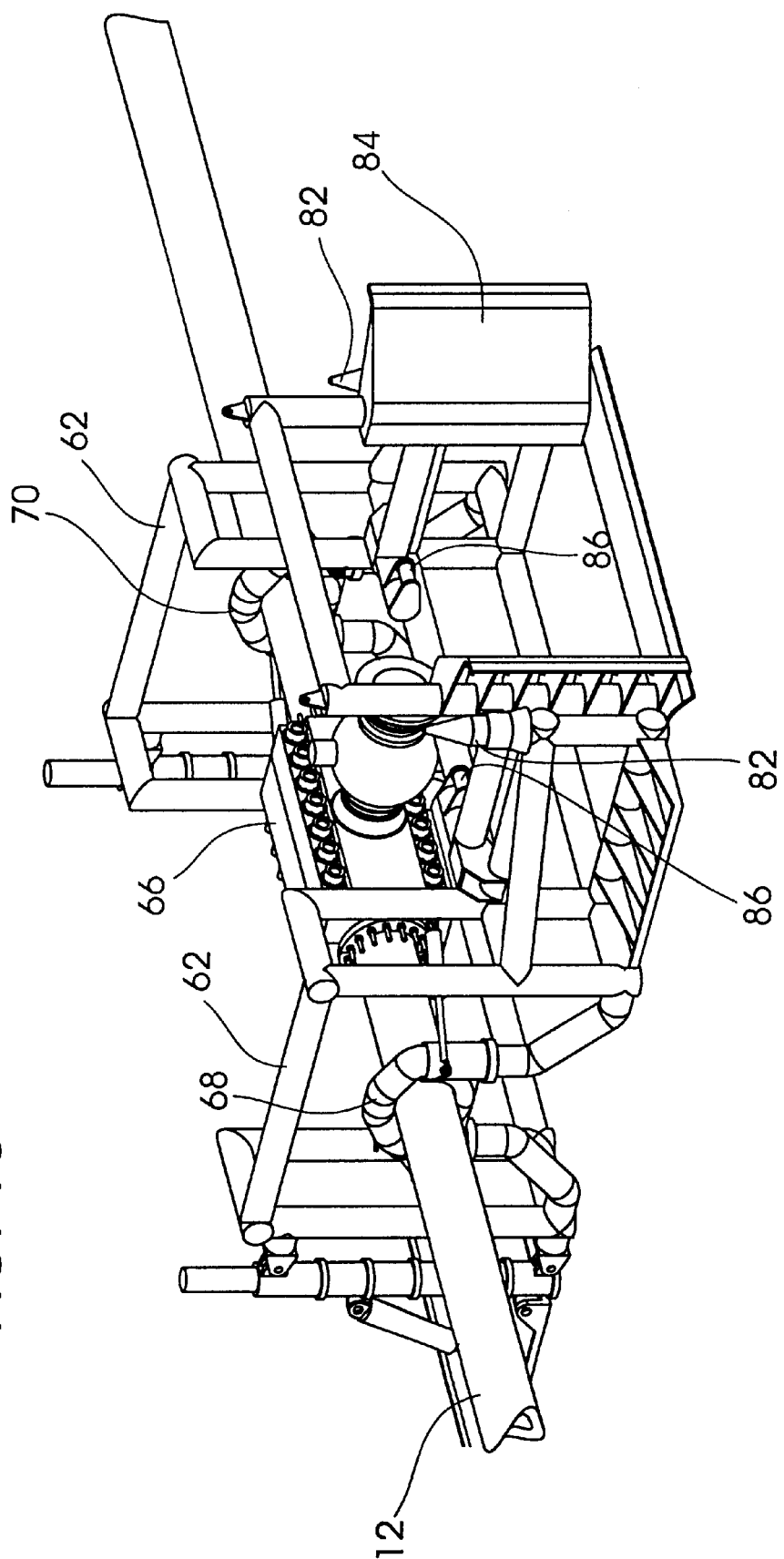
FIG. 18 illustrates the lateral pipe connector guide landed out onto the hot tap fitting frame.

In the next sequence seen in FIG. 17, a lateral spool connector guide 84 is lowered from the surface and stabbed over the pair of vertical guideposts 82. After initial guidance by the ROV, the lateral connector guide 84 lands out on the hot tap fitting frame structure 62. FIG. 18 shows the lateral spool connector guide 84 completely landed out on the fitting frame structure 62. The guide 84 includes a pair of opposed walls.

Figure 19:
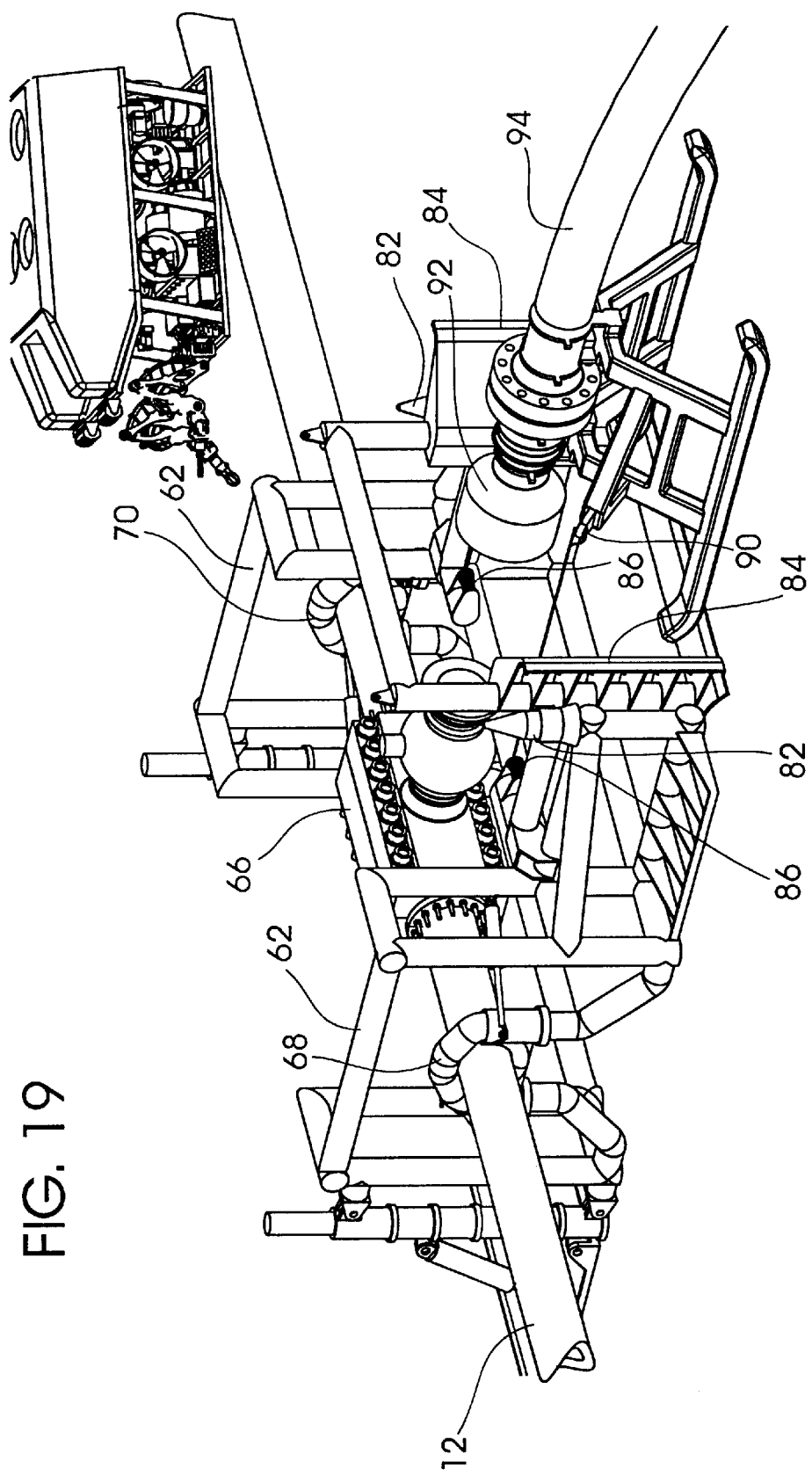
FIG. 19 illustrates the lateral pipeline connector and skid assembly being pulled in to close proximity of an isolation valve.

As seen in FIG. 19, after the lateral spool connector guide 84 has landed out on the hot tap fitting frame 62, a lateral spool sled 88, having a production or other branch pipeline 94, is brought in proximity with the structure 62. The ROV 18 pulls, in sequence, wires from a pair of small hydraulic winches 86 installed on the connector guide 84 out to a lateral spool sled 88 which has been positioned near the pipeline 12. The ROV 18 then attaches the wires to structural points 90 on the sled 88. Next, the ROV 18 actuates the hydraulic winches 86 to pull the lateral spool sled 88 to a position within the connector guide 84. From that position, the sled 88 is guided to a final position wherein a flowline connector 92 contacts a mating flange on the ball valve 64. The connecting pipeline, or spool 94 is connected to the existing pipeline 12 by means of the flowline connector 92.

A series of steps will next be taken to connect the existing pipeline 12 into a production branch or other unpressurized pipeline 94 by means of the lateral spool tie-in to be described herein. In a preferred example, the following steps occur.

Figure 20:
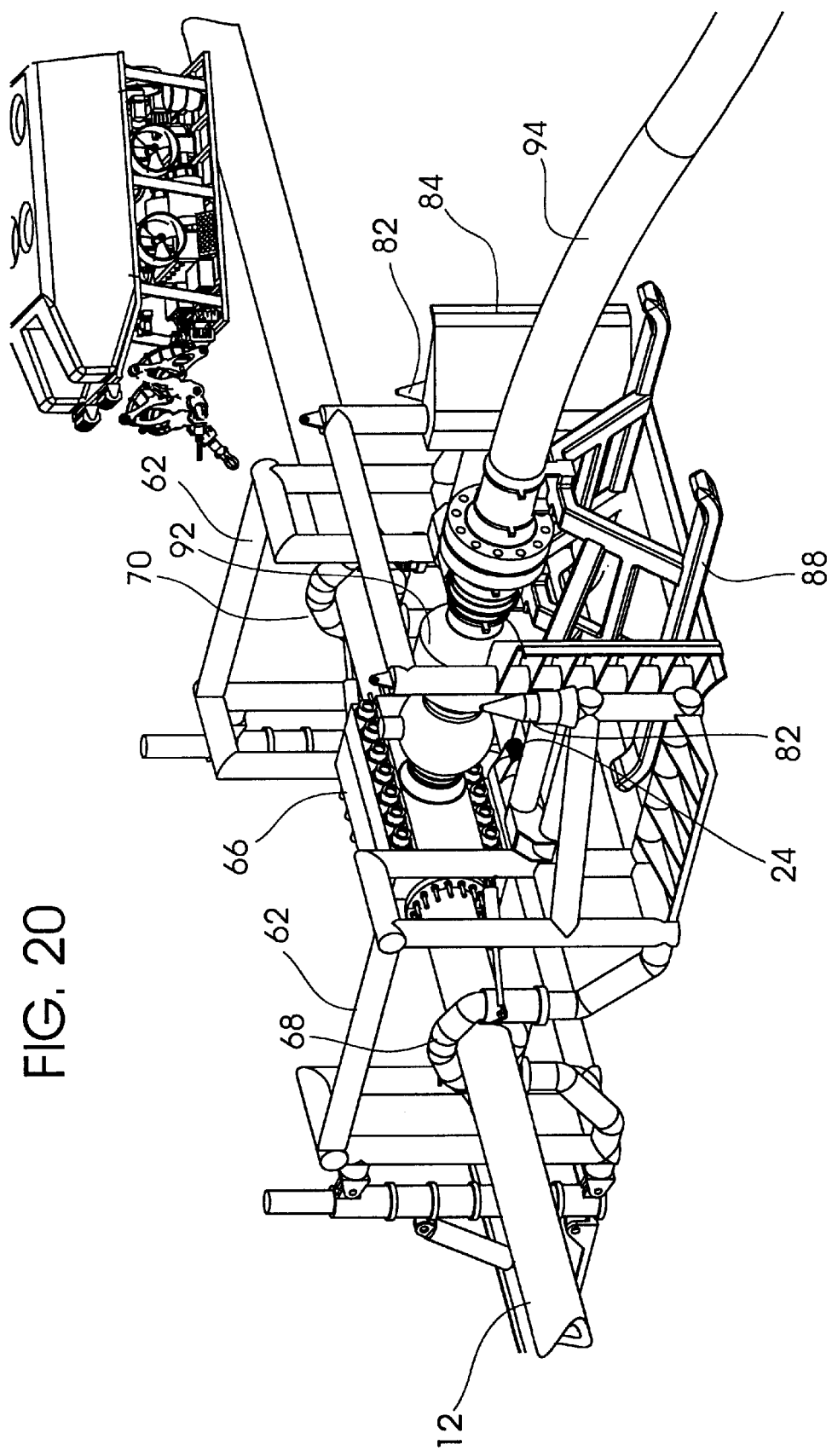
FIG. 20 illustrates the lateral pipeline connector aligned with and locked on to the isolation valve flange.

As seen in FIG. 20, after the flowline connector 92 has seated against a corresponding flange on the ball valve 64, the ROV 18 hydraulically actuates the connector 92 to firmly connect it to the ball valve. In the embodiment illustrated, a collet connector hydraulically locks the lateral spool to the ball valve 64 then seals off the lateral spool/connector hub interfaces. After this connection has been made, the ROV 18 will perform a leak test of the interface and "open" the ball valve 64 to permit fluid flow from the existing pipeline 12 through the pipeline system.

Figure 21:
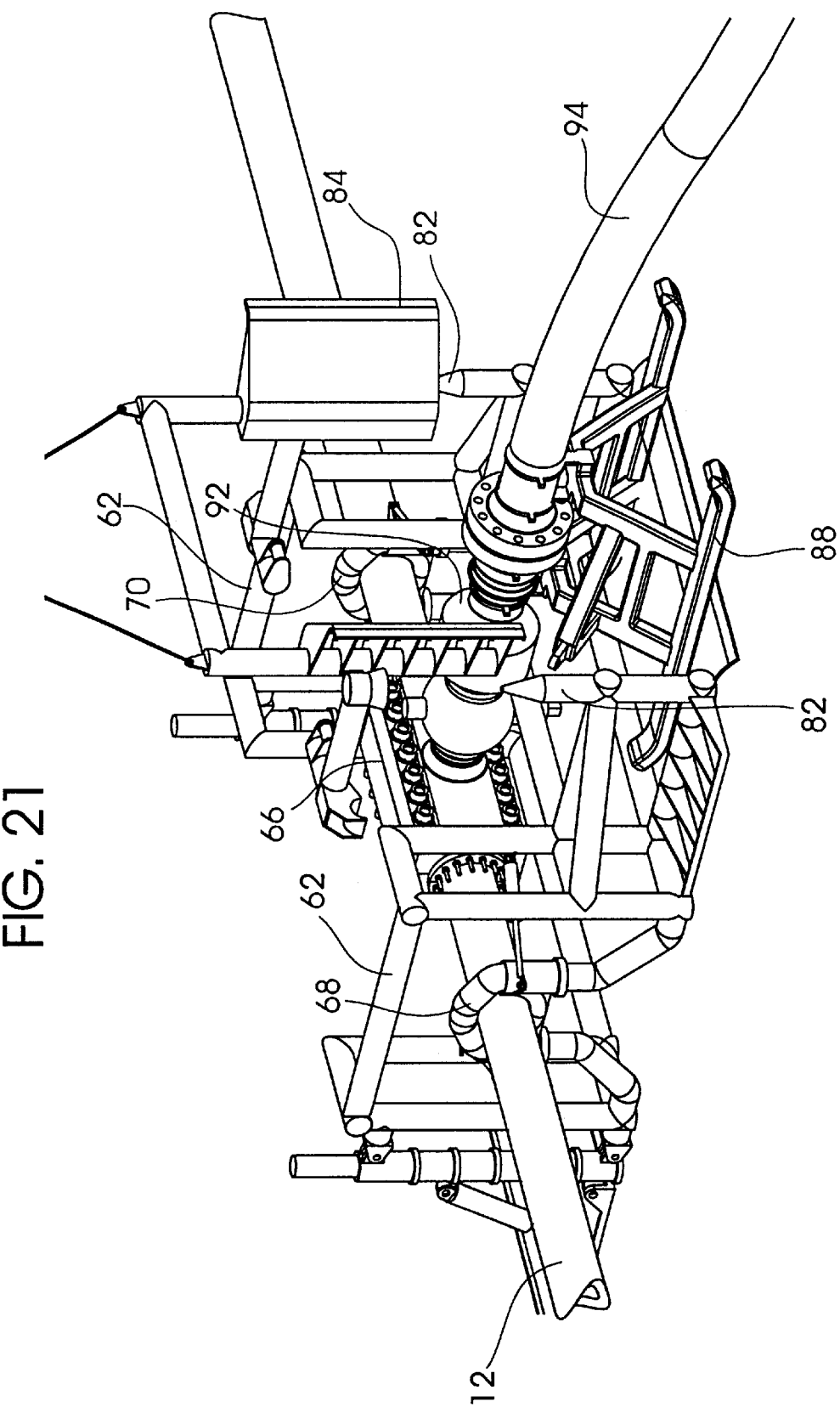
FIG. 21 illustrates the lateral pipe connector guide released from the hot tap fitting frame and being retrieved to the surface.

After all checks and tests have been satisfactorily performed, the connector guide 84 is retrieved to the surface and recovered as seen in FIG. 21.

The foregoing describes connection of a production branch or other pipeline to the existing pipeline. Other configurations are possible within the scope of the invention.

Whereas the present invention has been described in relation to the drawings attached hereto, it should be understood that other and further modifications, apart from those shown or suggested herein, may be made within the spirt and scope of this invention.

What is claimed is:

1. A diverless process of tapping a pressurized subsea pipeline without removing said pipeline from service, which process comprises:
    (a) lowering and landing a measurement tool onto said pipeline and checking roundness and straightness of said pipeline with said measurement tool;
    (b) lowering and landing at least a pair of pipe lift frames onto said pipeline;
    (c) lifting said pipeline by said pipe lift frames;
    (d) lowering and landing a combined hot tap fitting frame and hot tap machine onto said pipeline between said pipe fitting frames;
    (e) tapping said pipeline with said hot tap machine; and
    (f) lowering said pipeline with said pipe lifting frames.

2. A diverless process of tapping a pressurized subsea pipeline as set forth in claim 1 including the steps of pre-installing said hot tap machine, a ball valve, and pipe clamp on said fitting frame prior to lowering and landing said frame.

3. A diverless process of tapping a pressurized subsea pipeline as set forth in claim 1 including the additional preliminary steps of:
    (a) excavating from underneath said pipeline by using a remotely operated vehicle (ROV) to allow unrestricted installation of required tools;
    (b) cleaning off said pipeline using brushes or low pressure water jets; and
    (c) removing protective or external coatings from said pipeline.

4. A diverless process of tapping a pressurized subsea pipeline as set forth in claim 1 including the additional steps prior to said lowering and landing of said hot tap fitting frame and hot tap machine of:
    (a) lowering and landing a weld bead removal tool onto said pipeline; and
    (b) grinding, milling or machining any weld beads from said pipeline.

5. A diverless process of tapping a pressurized subsea pipeline as set forth in claim 1 wherein said step of lowering and landing a pair of pipe lifting frames onto said pipeline includes the additional steps of:
    (a) lowering and landing each pipe lifting frame at a prescribed spacing from a selected hot tap location;
    (b) rotating a plurality of mud mats on said pipe lifting frames from a travel position to a down and locked position before final touchdown; and
    (c) closing pipe support locking devices of each pipe lifting frame on said pipeline.

6. A diverless process of tapping a pressurized subsea pipeline as set forth in claim 1 including the additional step of again lowering and landing said measurement tool onto said pipeline after said pipeline has been elevated from the sea floor by said pair of pipe lifting frames and retaking said checks and measurements.

7. A diverless process of tapping a pressurized subsea pipeline as set forth in claim 1 including the additional preliminary steps of a visual condition inspection of the seabed and vicinity including the use of a camera to report bottom conditions, visibility, type of soil, water current, location of circumferential and longitudinal weld seams.

8. A diverless process of tapping a pressurized subsea pipeline as set forth in claim 1 including the additional step of disconnecting and retrieving said hot tap machine after tapping.

9. A diverless process of tapping a pressurized subsea pipeline as set forth in claim 1 including the additional step of lowering and landing a lateral or spool pipe connector guide after tapping.

10. A diverless process of tapping a pressurized subsea pipeline as set forth in claim 9 including an additional step of pulling in a lateral or spool pipe section.

11. A diverless process of tapping a pressurized subsea pipeline as set forth in claim 10 including an additional step of connecting said lateral or spool pipe section to said pipeline by means of a mechanical or hydraulic connector.

\* \* \* \* \*